United States Patent
Dozen et al.

(10) Patent No.: US 11,556,286 B2
(45) Date of Patent: Jan. 17, 2023

(54) PRINT JOB TRANSMISSION DEVICE FOR TRANSMITTING A PRINT JOB, IMAGE FORMING DEVICE FOR EXECUTING THE PRINT JOB, AND IMAGE FORMING SYSTEM

(71) Applicant: KYOCERA Document Solutions Inc., Osaka (JP)

(72) Inventors: Kazuki Dozen, Osaka (JP); Takanori Miyamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/386,823

(22) Filed: Jul. 28, 2021

(65) Prior Publication Data

US 2022/0043614 A1    Feb. 10, 2022

(30) Foreign Application Priority Data

Aug. 4, 2020  (JP) .............................. JP2020-132469

(51) Int. Cl.
    *G06F 3/12*    (2006.01)
(52) U.S. Cl.
    CPC .......... *G06F 3/1208* (2013.01); *G06F 3/1253* (2013.01); *G06F 3/1286* (2013.01)

(58) Field of Classification Search
    CPC .... G06F 3/1208; G06F 3/1253; G06F 3/1256; G06F 3/1286; H04N 1/0044; H04N 1/32363; H04N 1/32379; H04N 2201/325; H04N 2201/0087
    USPC ................................................. 358/1.15, 1.16
    See application file for complete search history.

(56) References Cited

U.S. PATENT DOCUMENTS

| | | | | |
|---|---|---|---|---|
| 2004/0139402 | A1* | 7/2004 | Azami | ................... G06F 40/106 715/274 |
| 2018/0101346 | A1* | 4/2018 | Suzuki | ................... G06F 3/1258 |

FOREIGN PATENT DOCUMENTS

JP    2001-067347    3/2001

* cited by examiner

*Primary Examiner* — Kent Yip
(74) *Attorney, Agent, or Firm* — Lex IP Meister, PLLC

(57) ABSTRACT

When transmitting a print job to the image forming device, the print job transmission section transmits also a preview image of the print job generated by the preview image generation section to the image forming device, requests the preview image from the image forming device, acquires the preview image from the image forming device, and displays the acquired preview image.

9 Claims, 13 Drawing Sheets

PRINT JOB TRANSMISSION DEVICE FOR TRANSMITTING A PRINT JOB, IMAGE FORMING DEVICE FOR EXECUTING THE PRINT JOB, AND IMAGE FORMING SYSTEM

INCORPORATION BY REFERENCE

This application is based upon, and claims the benefit of priority from, corresponding Japanese Patent Application No. 2020-132469 filed in the Japan Patent Office on Aug. 4, 2020, the entire contents of which are incorporated herein by reference.

BACKGROUND

Field of the Invention

This disclosure relates to a print job transmission device that transmits a print job, an image forming device, and an image forming system.

Description of Related Art

Typically, an image forming system including an image forming device that executes printing and a print job transmission device that transmits a print job to the image forming device is known. The print job transmission device generates a preview image of the print job and displays the generated preview image.

SUMMARY

A print job transmission device of the present disclosure includes a preview image generation section that generates a preview image of a print job, a print job transmission section that transmits a print job to an image forming device that executes printing in accordance with the print job, a preview image acquisition section that acquires the preview image, and a preview image display section that displays the preview image. When transmitting a print job to the image forming device, the print job transmission section transmits also a preview image of the print job generated by the preview image generation section to the image forming device. The preview image acquisition section requests the preview image from the image forming device and acquires the preview image from the image forming device. The preview image display section displays the preview image acquired by the preview image acquisition section from the image forming device.

An image forming device of the present disclosure includes a print execution section that executes printing in accordance with a print job transmitted from a print job transmission device, a preview image storage section that stores a preview image of the print job; and a preview image transmission section that transmits the preview image. The preview image storage section stores the preview image transmitted from the print job transmission device. When the preview image stored by the preview image storage section is requested by the print job transmission device, the preview image transmission section transmits the preview image to the print job transmission device.

An image forming system of the present disclosure includes an image forming device that executes printing in accordance with a print job, and a plurality of print job transmission devices each of which transmits a print job to the image forming device. The print job transmission device includes a preview image generation section that generates a preview image of a print job, a print job transmission section that transmits a print job to the image forming device, a preview image acquisition section that acquires a preview image, and a preview image display section that displays the preview image. The image forming device includes a print execution section that executes printing in accordance with a print job transmitted from the print job transmission device, a preview image storage section that stores a preview image, and a preview image transmission section that transmits the preview image. When transmitting a print job to the image forming device, the print job transmission section transmits also a preview image of the print job generated by the preview image generation section to the image forming device. The preview image storage section stores the preview image transmitted from the print job transmission device. The preview image acquisition section requests the preview image from the image forming device and acquires the preview image from the image forming device. When the preview image stored by the preview image storage section is requested by the print job transmission device, the preview image transmission section transmits the preview image to the print job transmission device. The preview image display section displays the preview image acquired by the preview image acquisition section from the image forming device.

A computer-readable non-temporary storage medium of the present disclosure stores a print job transmission program, and the print job transmission program allows a computer to realize a print job transmission device that includes a preview image generation section that generates a preview image of a print job, a print job transmission section that transmits a print job to an image forming device that executes printing in accordance with the print job, a preview image acquisition section that acquires the preview image, and a preview image display section that displays the preview image. When transmitting a print job to the image forming device, the print job transmission section transmits also a preview image of the print job generated by the preview image generation section to the image forming device. The preview image acquisition section requests the preview image from the image forming device and acquires the preview image from the image forming device. The preview image display section displays the preview image acquired by the preview image acquisition section from the image forming device.

A computer-readable non-temporary storage medium of the present disclosure stores an image forming program, and the image forming program allows an image forming device to realize a print execution section that executes printing in accordance with a print job transmitted from a print job transmission device that transmits a print job, a preview image storage section that stores a preview image of the print job, and a preview image transmission section that transmits the preview image. The preview image storage section stores the preview image transmitted from the print job transmission device. When the preview image stored by the preview image storage section is requested by the print job transmission device, the preview image transmission section transmits the preview image to the print job transmission device.

A print job transmission device of the present disclosure includes a preview image generation section that generates a preview image of a print job, a print job transmission section that transmits a print job to an image forming device that executes printing in accordance with the print job, a preview image acquisition section that acquires the preview image, and a preview image display section that displays the preview image. When transmitting a print job to the image forming device, the print job transmission section transmits also a preview image of the print job generated by the preview image generation section to another print job transmission device. The preview image acquisition section requests the preview image from the another print job transmission device and acquires the preview image from the another print job transmission device. The preview image display section displays the preview image acquired by the preview image acquisition section from the another print job transmission device.

An image forming system of the present disclosure includes an image forming device that executes printing in accordance with a print job, and a plurality of print job transmission devices each of which transmits a print job to the image forming device. The print job transmission device includes a preview image generation section that generates a preview image of a print job, a print job transmission section that transmits a print job to the image forming device, a preview image acquisition section that acquires a preview image, and a preview image display section that displays the preview image. When transmitting a print job to the image forming device, the print job transmission section transmits also a preview image of the print job generated by the preview image generation section to another print job transmission device. The preview image acquisition section requests the preview image from the another print job transmission device and acquires the preview image from the another print job transmission device. The preview image display section displays the preview image acquired by the preview image acquisition section from the another print job transmission device.

A computer-readable non-temporary storage medium of the present disclosure stores a print job transmission program, and the print job transmission program allows a computer to realize a print job transmission device that includes a preview image generation section that generates a preview image of a print job, a print job transmission section that transmits a print job to an image forming device that executes printing in accordance with the print job, a preview image acquisition section that acquires the preview image, and a preview image display section that displays the preview image. When transmitting a print job to the image forming device, the print job transmission section transmits also a preview image of the print job generated by the preview image generation section to another print job transmission device. The preview image acquisition section requests the preview image from the another print job transmission device and acquires the preview image from the another print job transmission device. The preview image display section displays the preview image acquired by the preview image acquisition section from the another print job transmission device.

DETAILED DESCRIPTION

Embodiments of the disclosure will be described hereinafter with use of the drawings.

First Embodiment

First, an image forming system according to a first embodiment of the disclosure will be described.

Figure 1:
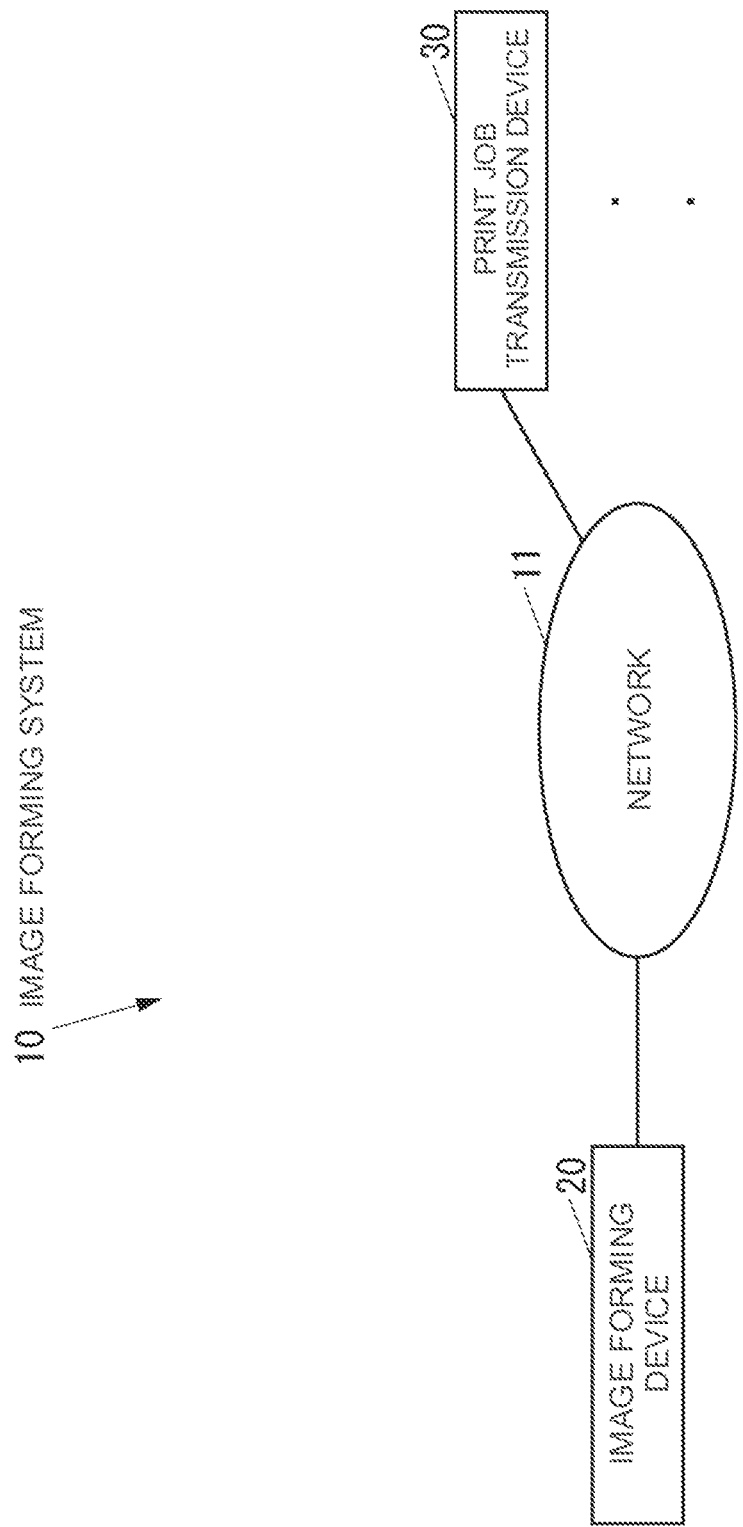
FIG. 1 is a block diagram of an image forming system according to a first embodiment of the disclosure.

FIG. 1 is a block diagram of an image forming system 10 according to the present embodiment.

As illustrated in FIG. 1, the image forming system 10 includes an image forming device 20 that executes printing. The image forming device 20 includes, for example, a multifunction peripheral (MFP), a production printer, and the like.

The image forming system 10 includes a print job transmission device 30 as a computer that transmits a print job to the image forming device 20. The image forming system 10 can include at least one print job transmission device similar in configuration to the print job transmission device 30, other than the print job transmission device 30. The print job transmission device includes, for example, a personal computer (PC).

The image forming device 20 and the print job transmission device in the image forming system 10 can communicate to each other, for example, via a network 11 such as a local area network (LAN) or the Internet. The image forming device 20 and the print job transmission device in the image forming system 10 configure a client-server type network in which the image forming device 20 is a server and the print job transmission device is a client.

Figure 2:
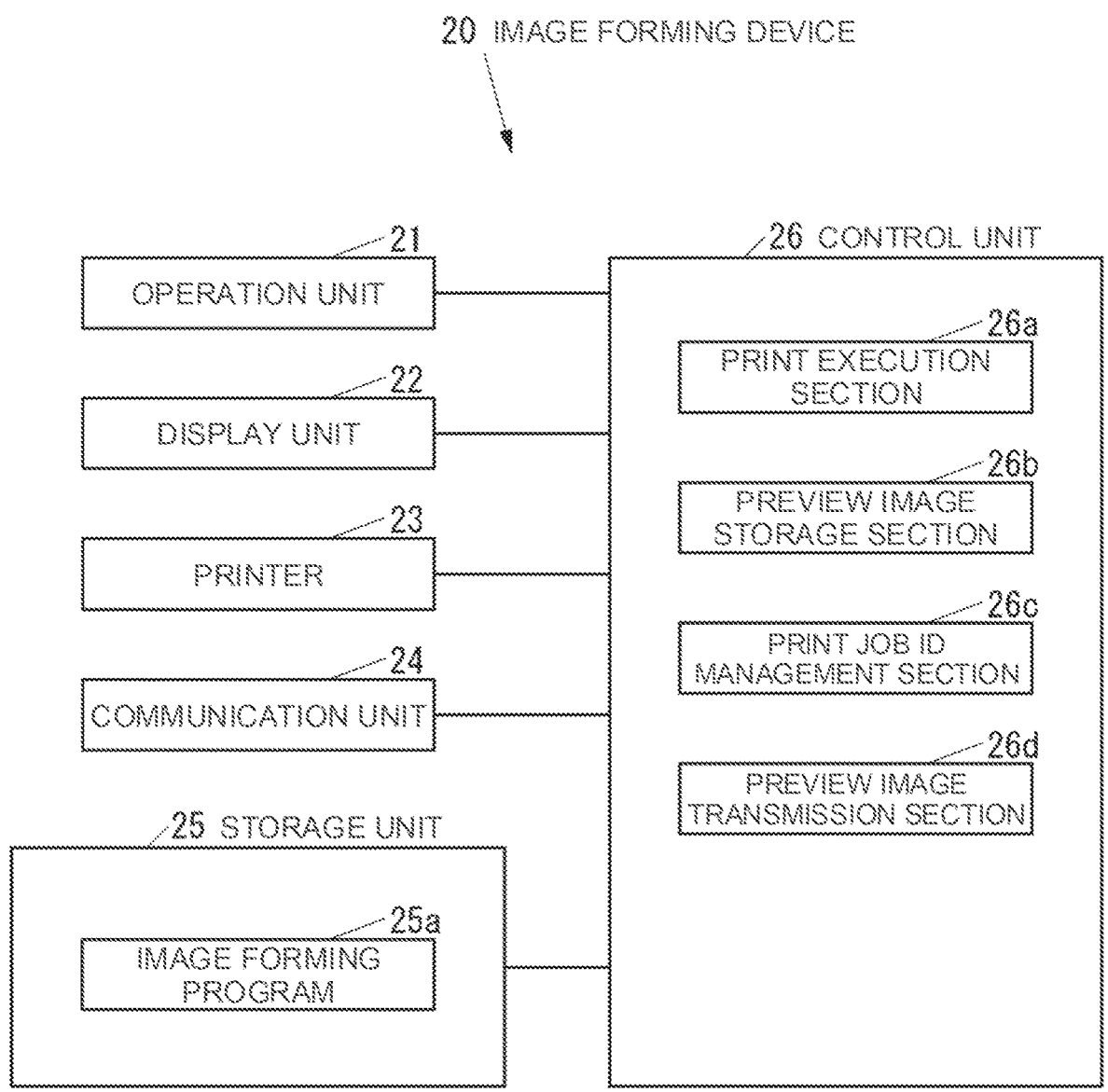
FIG. 2 is a block diagram of an image forming device illustrated in FIG. 1.

FIG. 2 is a block diagram of the image forming device 20.

As illustrated in FIG. 2, the image forming device 20 includes an operation unit 21 that is an operation device such as a button to which various operations are input, a display unit 22 that is a display device such as a liquid crystal display (LCD) that displays various information, a printer 23 that is a printing device that prints images on a recording medium such as paper, a communication unit 24 that is a communication device that communicates directly with an external device via a network such as a LAN or the Internet or by wire or wirelessly without a network, a storage unit 25 that is a non-volatile storage device such as a semiconductor memory or a hard disk drive (HDD) that stores various information, and a control unit 26 that controls the entire image forming device 20.

The storage unit 25 stores an image forming program 25*a* for forming images. The image forming program 25*a* may be installed in the image forming device 20, for example, at the manufacturing stage of the image forming device 20, may be additionally installed in the image forming device 20 from an external storage medium such as a universal serial bus (USB) memory, or may be additionally installed in the image forming device 20 from a network.

The control unit 26 includes, for example, a central processing unit (CPU), a read only memory (ROM) storing a program and various data, and a random access memory (RAM) as a memory applied as a workspace of the CPU of the control unit 26. The CPU of the control unit 26 executes the program stored in the storage unit 25 or the ROM of the control unit 26.

The control unit 26 executes the image forming program 25*a* and thereby realizes a print execution section 26*a* that executes printing in accordance with a print job transmitted from the print job transmission device, a preview image storage section 26*b* that stores a preview image of the print job, a print job ID management section 26*c* that manages a print job ID as identification information of the print job, and a preview image transmission section 26*d* that transmits the preview image.

Figure 3:
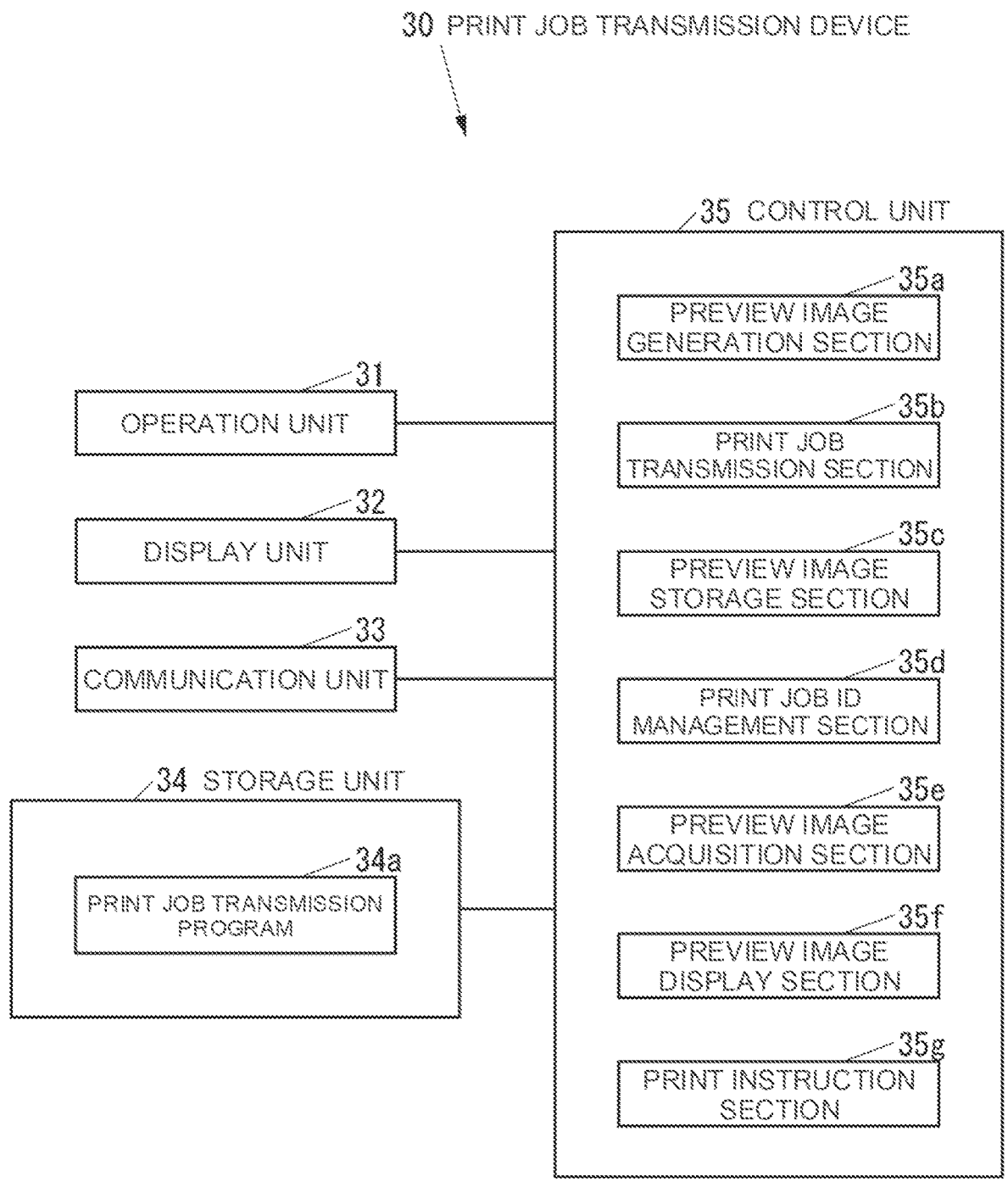
FIG. 3 is a block diagram of a print job transmission device illustrated in FIG. 1.

FIG. 3 is a block diagram of the print job transmission device 30.

As illustrated in FIG. 3, the print job transmission device 30 includes an operation unit 31 that is an operation device such as a keyboard and a mouse to which various operations are input, a display unit 32 that is a display device such as an LCD that displays various information, a communication unit 33 that is a communication device that communicates directly with an external device via a network such as a LAN or the Internet or by wire or wirelessly without a network, a storage unit 34 that is a non-volatile storage device such as a semiconductor memory or a hard disk drive (HDD) that stores various information, and a control unit 35 that controls the entire print job transmission device 30.

The storage unit 34 stores a print job transmission program 34*a* for transmitting a print job. The print job transmission program 34*a* may be installed in the print job transmission devices 30, for example, at the manufacturing stage of the print job transmission device 30, may be additionally installed in the print job transmission device 30 from an external storage medium such as a compact disk (CD), a digital versatile disk (DVD), or a USB memory, or may be additionally installed in the print job transmission device 30 from a network.

The control unit 35 includes, for example, a CPU, a ROM storing a program and various data, and a RAM as a memory applied as a workspace of the CPU of the control unit 35. The CPU of the control unit 35 executes the program stored in the storage unit 34 or the ROM of the control unit 35.

The control unit 35 executes the print job transmission program 34*a* and thereby realizes a preview image generation section 35*a* that generates a preview image of a print job, a print job transmission section 35*b* that transmits a print job to the image forming device 20, a preview image storage section 35*c* that stores the preview image, a print job ID management section 35*d* that manages a print job ID, a preview image acquisition section 35*e* that acquires the preview image, a preview image display section 35*f* that displays the preview image, and a print instruction section 35*g* that instructs the image forming device 20 to execute printing in accordance with the print job.

Next, the operation of the image forming system 10 will be described.

First, the operation of the image forming system 10 when the print job transmission device 30 transmits a print job to the image forming device 20 will be described.

Figure 4:
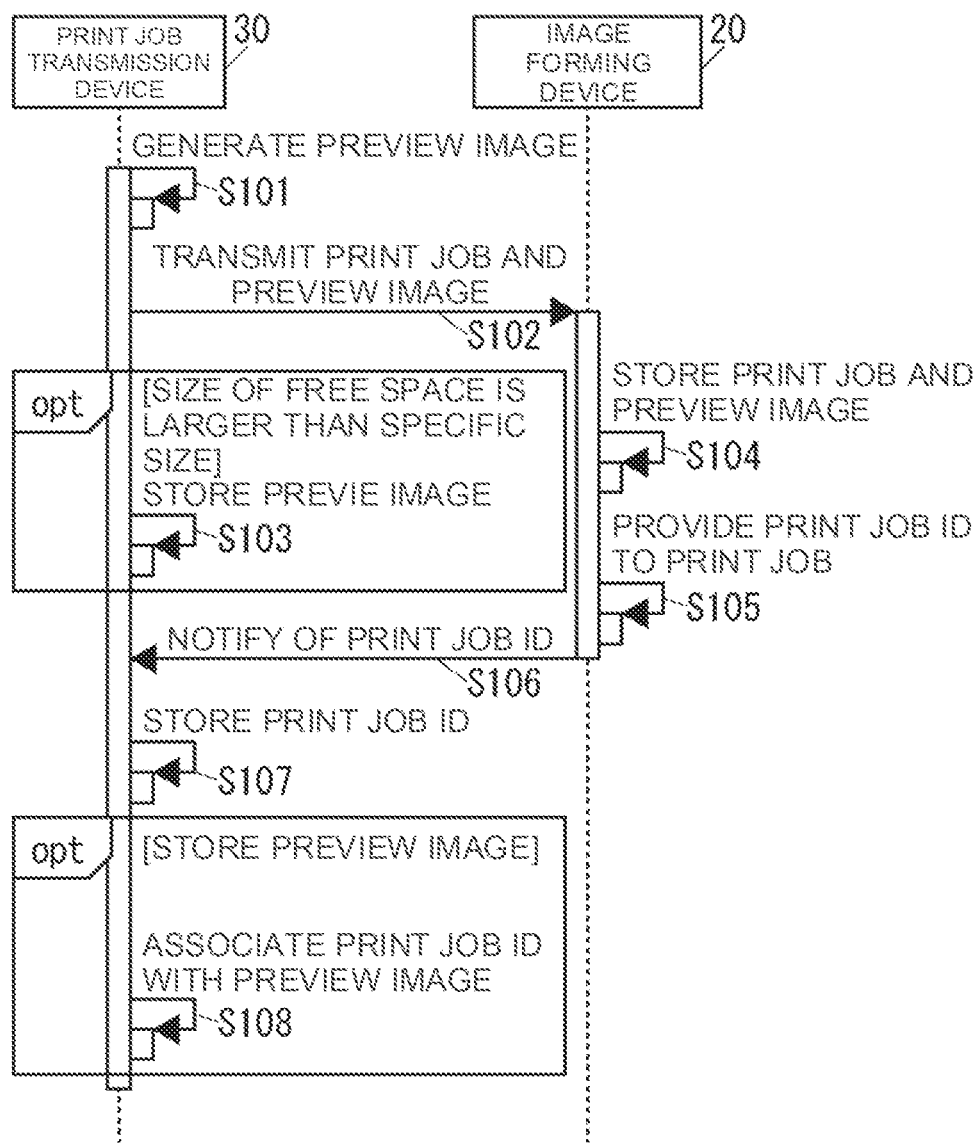
FIG. 4 is a sequence diagram of operations of the image forming system illustrated in FIG. 1 when the print job transmission device transmits a print job to the image forming device.

FIG. 4 is a sequence diagram of operations of the image forming system 10 when the print job transmission device 30 transmits a print job to the image forming device 20.

A user of the print job transmission device 30 can instruct the print job transmission device 30 from the operation unit 31 via the print job transmission program 34*a* to transmit a print job to the image forming device 20.

When transmission of a print job to the image forming device 20 is instructed, the preview image generation section 35*a* of the print job transmission device 30 interprets the print job as illustrated in FIG. 4 and thereby generates a preview image of the print job (101).

After the processing of S101, the print job transmission section 35*b* of the print job transmission device 30 transmits the print job for which the preview image is generated in S101 and the preview image generated in S101 to the image forming device 20 (S102).

After the processing of S102, the preview image storage section 35*c* of the print job transmission device 30 stores the preview image generated in S101 in the storage unit 34 in a case where the size of a free space in a space for storing the preview image in the storage unit 34 is equal to or larger than a specific size (S103). Here, the specific size may be, for example, the size of the preview image generated in S101. In addition, the control unit 35 of the print job transmission device 30 may perform the processing of S103 before the processing of S102.

When the print job and the preview image are transmitted from the print job transmission device 30 in S102, the preview image storage section 26*b* of the image forming device 20 associates the print job and the preview image that are transmitted from the print job transmission device 30 in S102 with each other and stores the print job and the preview image in the storage unit 25 (S104). In addition, when the Hold setting that is a setting for allowing the image forming device 20 to wait for the execution of printing in accordance with a print job is provided to the print job transmitted from the print job transmission device 30 in S102, the print execution section 26*a* of the image forming device 20 waits for the execution of printing in accordance with the print job. Then, for example, when the execution of printing in accordance with the print job waiting to be executed is instructed via the print job transmission program 34*a* from the user of the print job transmission device 30, the print execution section 26*a* executes printing in accordance with the print job. On the other hand, the Hold setting is not provided to the print job transmitted from the print job transmission device 30 in S102. In such a case, when there is no previous print job to be executed before the print job, the print execution section 26*a* immediately executes printing in accordance with the print job.

After the processing of S104, the print job ID management section 26c of the image forming device 20 provides a print job ID to the print job stored in S104 (S105).

After the processing of S105, the print job ID management section 26c notifies the print job transmission device 30 of the print job ID provided in S105 (S106).

When the print job ID is notified in S106, the print job ID management section 35d of the print job transmission device 30 stores the print job ID notified in S106 in the storage unit 34 (S107).

In a case where the preview image is stored in the preview image storage section 35c of the print job transmission device 30 in S103, after the processing of S107, the preview image storage section 35c associates the print job ID notified in S106 with the preview image stored in S103 (S108). In addition, the control unit 35 of the print job transmission device 30 may perform the processing of S108 before the processing of S107.

The operation of the image forming system 10 when the print job transmission device 30 transmits a print job to the image forming device 20 is described as above. However, the same applies to the operation of the image forming system 10 when a print job transmission device in the image forming system 10 other than the print job transmission device 30 transmits a print job to the image forming device 20.

Next, the operation of the image forming device 20 when a print job ID is notified to the print job transmission device will be described.

Figure 5:
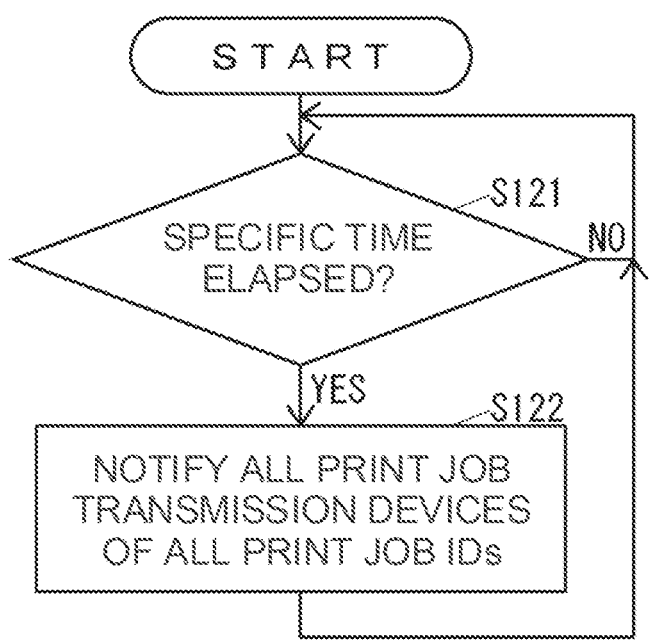
FIG. 5 is a flowchart of operations of the image forming device illustrated in FIG. 2 when a print job ID is notified to the print job transmission device.

FIG. 5 is a flowchart of the operation of the image forming device 20 when a print job ID is notified to the print job transmission device.

As illustrated in FIG. 5, the print job ID management section 26c of the image forming device 20 judges whether a specific time has elapsed until the specific time is judged to have elapsed (S121). The "specific time" is, for example, 30 seconds. The "specific time" can be changed, for example, via the operation unit 21.

The print job ID management section 26c judges in S121 that the specific time has elapsed, and then notifies all of the print job transmission devices in the image forming system 10 of all of the print job IDs managed by the print job ID management section 26c itself (S122) and executes the processing of S121.

The operation illustrated in FIG. 5 by the image forming device 20 enables the print job ID management section of the print job transmission device to manage not only the print job ID transmitted to the image forming device 20 by the print job transmission device itself but also the print job ID transmitted to the image forming device 20 by another print job transmission device.

In the example description above, the print job ID management section 26c periodically, for example, every 30 seconds notifies all of the print job transmission devices in the image forming system 10 of all of the print job IDs managed by the print job ID management section 26c of the image forming device 20. However, in response to a request from the print job transmission device, the print job ID management section 26c may notify of all of the print job IDs managed by itself.

Next, the operation of the image forming system 10 when the print job transmission device 30 displays a preview image of a print job will be described.

Figure 6:
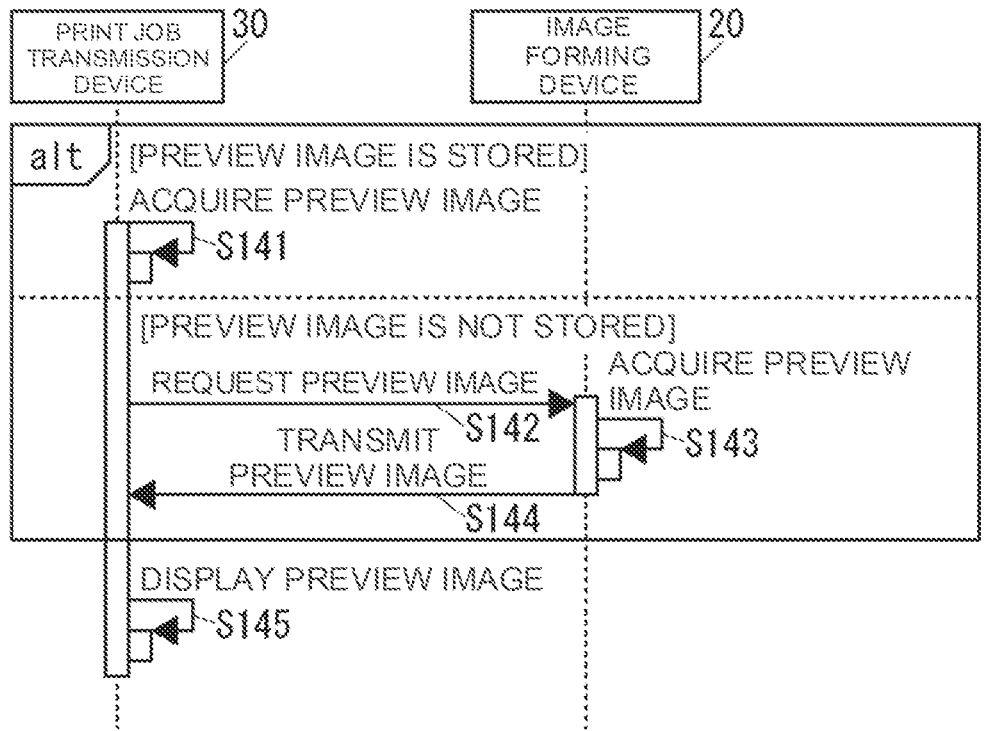
FIG. 6 is a sequence diagram of operations of the image forming system illustrated in FIG. 1 when the print job transmission device displays a preview image of a print job.

FIG. 6 is a sequence diagram of operations of the image forming system 10 when the print job transmission device 30 displays a preview image of a print job.

By specifying a print job ID of the print job, the user of the print job transmission device 30 can instruct the print job transmission device 30 from the operation unit 31 via the print job transmission program 34a to display the preview image of the print job. In addition, the print job ID management section 35d of the print job transmission device 30 displays a list of the print job IDs managed by the print job ID management section 35d itself on the display unit 32 or otherwise and allows the user of the print job transmission device 30 to specify the print job ID.

The instruction of displaying the preview image of the print job is made, and then, in a case where the preview image associated with the print job ID of the print job is stored in the storage unit 34 as illustrated in FIG. 6, the preview image acquisition section 35e of the print job transmission device 30 acquires the preview image from the storage unit 34 (S141).

When the preview image associated with the print job ID of the print job for which display of the preview image is instructed is not stored in the storage unit 34, the preview image acquisition section 35e requests the preview image of the print job from the image forming device 20 (S142). Here, the preview image acquisition section 35e includes the print job ID associated with the preview image that is a target of the request in S142 into the request.

The preview image transmission section 26d of the image forming device 20 receives the request in S142 from the print job transmission device 30 and then acquires from the storage unit 25 the preview image associated with the print job to which the print job ID included in the request is provided (S143).

After the processing of S143, the preview image transmission section 26d transmits the preview image acquired in S143 to the print job transmission device 30 (S144).

When the processing of S141 is completed or the preview image is transmitted from the image forming device 20 in S144, the preview image display section 35f of the print job transmission device 30 displays the preview image acquired in S141 or the preview image transmitted from the image forming device 20 in S144 on the display unit 32 (S145).

The operation of the image forming system 10 when the print job transmission device 30 displays a preview image of a print job is described as above. However, the same applies to the operation of the image forming system 10 when a print job transmission device in the image forming system 10 other than the print job transmission device 30 displays a preview image of a print job.

Next, the operation of the image forming system 10 when the print job transmission device 30 instructs the image forming device 20 to execute printing in accordance with a print job will be described.

Figure 7:
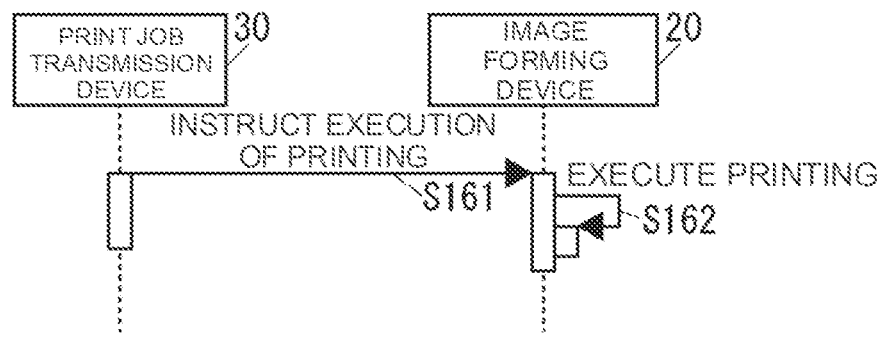
FIG. 7 is a sequence diagram of operations of the image forming system illustrated in FIG. 1 when the print job transmission device instructs the image forming device to execute printing in accordance with a print job.

FIG. 7 is a sequence diagram of operations of the image forming system 10 when the print job transmission device 30 instructs the image forming device 20 to execute printing in accordance with a print job.

After confirming the preview image displayed on the display unit such as the display unit 32 of any of the print job transmission devices in the image forming system 10, the user of the print job transmission device 30 can instruct the print job transmission device 30 from the operation unit 31 via the print job transmission program 34a to send an instruction to the image forming device 20 of executing printing in accordance with the print job that corresponds to the preview image. For example, the image forming device 20 waits for execution of printing in accordance with the print job that corresponds to the preview image displayed on the display unit 32. In such a case, after confirming the preview image, the user of the print job transmission device 30 can instruct the print job transmission device 30 via the print job transmission program 34a to send an instruction to the image forming device 20 of executing printing in accordance with the print job. Also, execution of printing in accordance with the print job that corresponds to the preview image displayed on the display unit 32 is finished in the image forming device 20. Even in such a case, after confirming the preview image, the user of the print job transmission device 30 can instruct the print job transmission device 30 via the print job transmission program 34a to send an instruction to the image forming device 20 of re-executing printing in accordance with the print job.

When the instruction to the image forming device 20 of executing printing in accordance with the print job is sent, the print instruction section 35g of the print job transmission device 30, as illustrated in FIG. 7, instructs the image forming device 20 to execute printing in accordance with the print job (S161). Here, the print instruction section 35g includes the print job ID associated with the preview image that is a target of the instruction in S161 into the request.

The print execution section 26a of the image forming device 20 receives the instruction in S161 from the print job transmission device 30 and then executes, with the printer 23, printing in accordance with the print job to which the print job ID included in the instruction is provided (S162).

The operation of the image forming system 10 when the print job transmission device 30 instructs the image forming device 20 to execute printing in accordance with a print job is described as above. However, the same applies to the operation of the image forming system 10 when a print job transmission device in the image forming system 10 other than the print job transmission device 30 instructs the image forming device 20 to execute printing in accordance with a print job.

As described above, in the image forming system 10, when transmitting a print job to the image forming device 20, the print job transmission device transmits also a preview image of the print job generate by the print job transmission device itself to the image forming device 20 (S102), and the image forming device 20 stores the preview image transmitted from the print job transmission device (S104). The print job transmission device requests the preview image from the image forming device 20 (S142) and acquires the preview image from the image forming device 20 (S144), and the print job transmission device displays the preview image acquired from the image forming device 20 (S145). Therefore, a print job transmission device other than the print job transmission device that has generated the preview image can display the preview image. In other words, when transmitting a print job to the image forming device 20, the print job transmission device transmits also a preview image of the print job generated by the print job transmission device itself to the image forming device 20 (S102), requests the preview image from the image forming device 20 (S142), acquires the preview image from the image forming device 20 (S144), and displays the acquired preview image (S145). Therefore, the print job transmission device can display not only the preview image generated by the print job transmission device itself but also a preview image generated by a print job transmission device other than the print job transmission device itself. In addition, the image forming device 20 stores the preview image transmitted from the print job transmission device (S104), and when the stored preview image is requested by the print job transmission device, the image forming device 20 transmits the preview image to the print job transmission device (S144). Therefore, the preview image can be displayed on a print job transmission device other than the print job transmission device that has generated the preview image.

Second Embodiment

First, an image forming system according to a second embodiment of the disclosure will be described.

Figure 8:
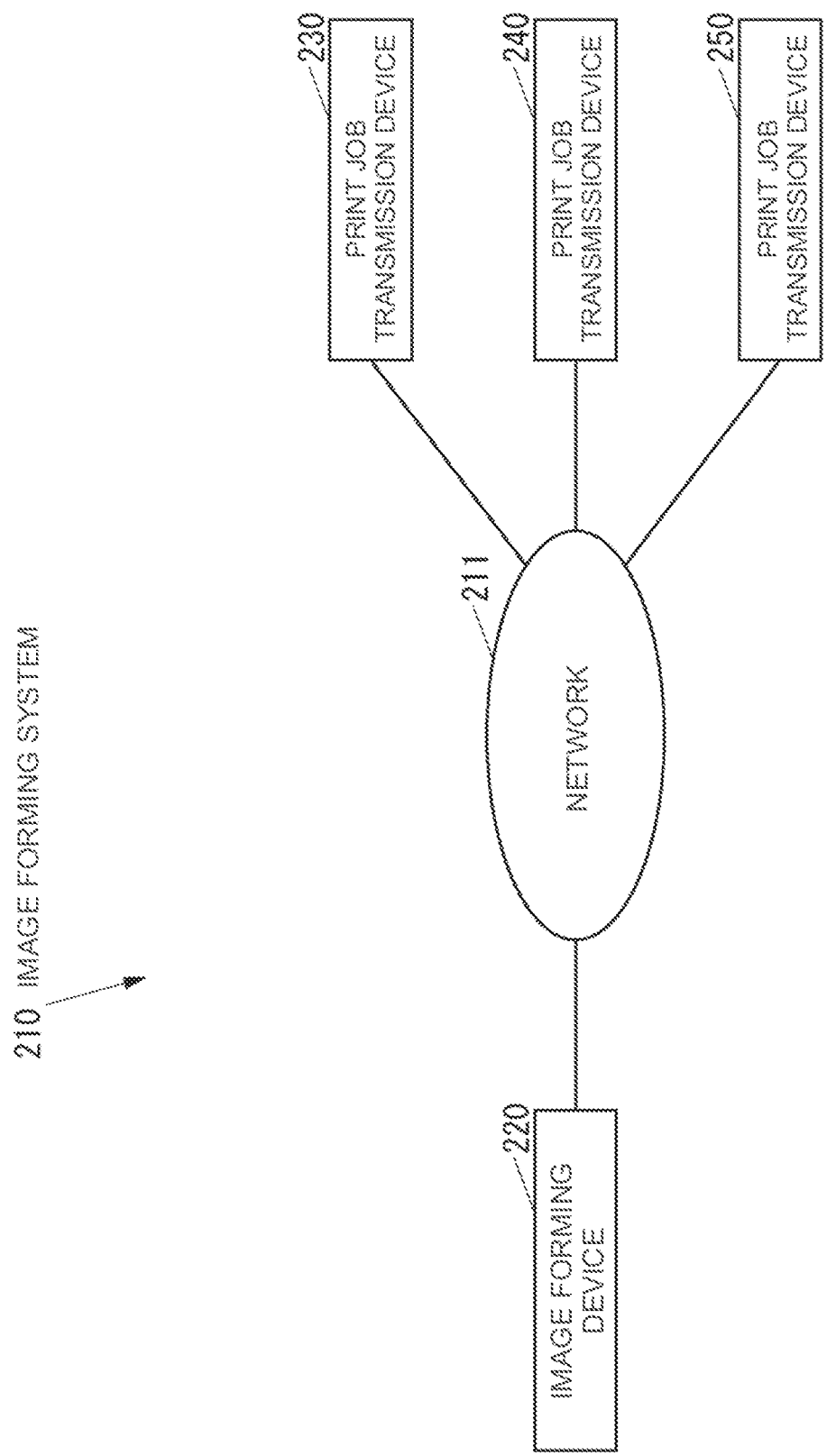
FIG. 8 is a block diagram of an image forming system according to a second embodiment of the disclosure.

FIG. 8 is a block diagram of an image forming system 210 according to the present embodiment.

As illustrated in FIG. 8, the image forming system 210 includes an image forming device 220 that executes printing. The image forming device 220 includes, for example, an MFP, a production printer, and the like.

The image forming system 210 includes a print job transmission device 230 as a computer that transmits a print job to the image forming device 220, and a print job transmission device 240 and a print job transmission device 250 that are configured in the same way as the print job transmission device 230. The print job transmission device includes, for example, a PC.

The image forming device 220, the print job transmission device 230, the print job transmission device 240, and the print job transmission device 250 can communicate to one another, for example, via a network 211 such as an LAN or the Internet. The image forming device 220, the print job transmission device 230, the print job transmission device 240, and the print job transmission device 250 configure a peer-to-peer type network.

Figure 9:
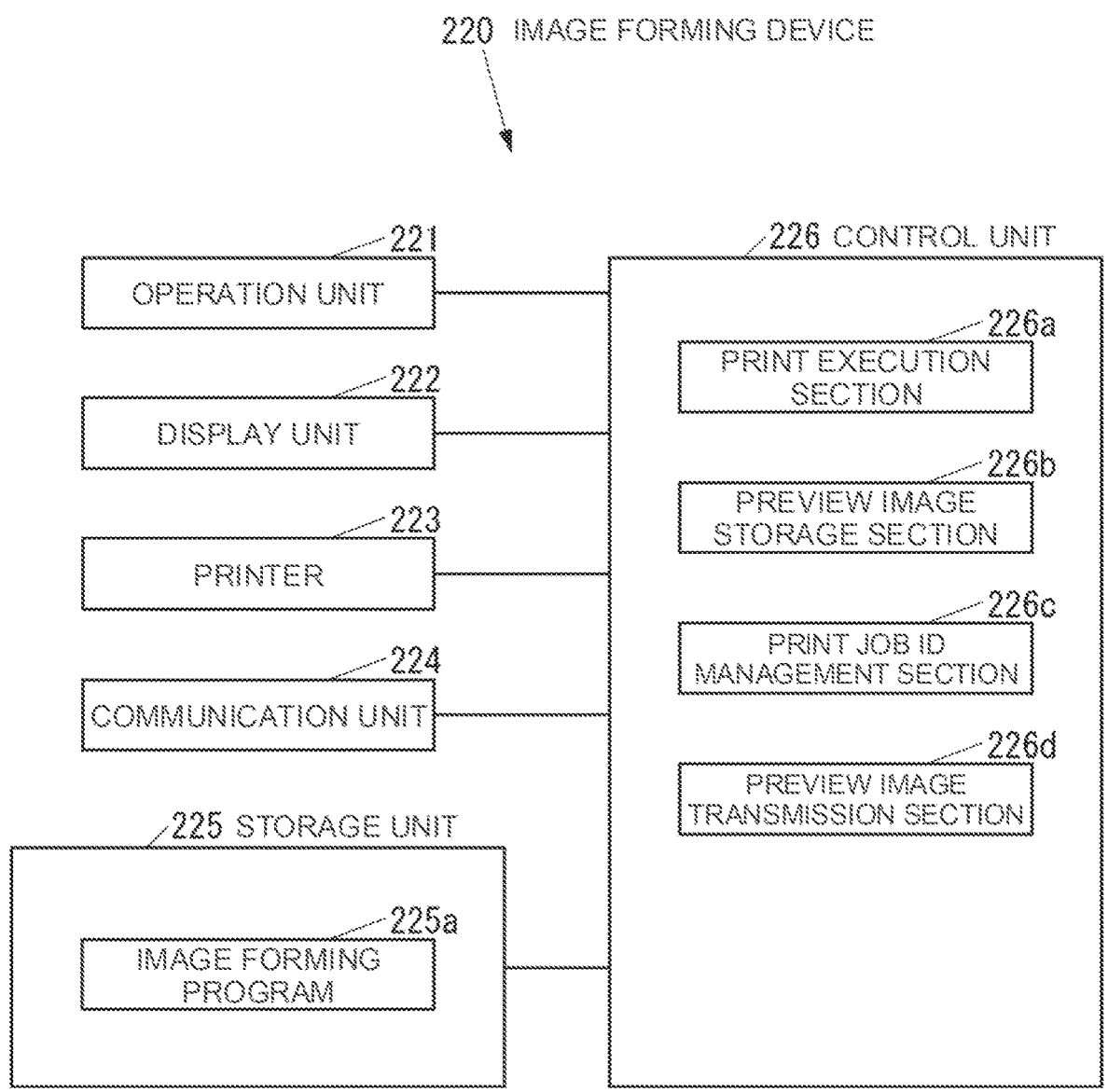
FIG. 9 is a block diagram of an image forming device illustrated in FIG. 8.

FIG. 9 is a block diagram of the image forming device 220.

As illustrated in FIG. 9, the image forming device 220 includes an operation unit 221 that is an operation device such as a button to which various operations are input, a display unit 222 that is a display device such as an LCD that displays various information, a printer 223 that is a printing device that prints images on a recording medium such as paper, a communication unit 224 that is a communication device that communicates directly with an external device via a network such as a LAN or the Internet or by wire or wirelessly without a network, a storage unit 225 that is a non-volatile storage device such as a semiconductor memory or a hard disk drive (HDD) that stores various information, and a control unit 226 that controls the entire image forming device 220.

The storage unit 225 stores an image forming program 225a for forming an image. The image forming program 225a may be installed in the image forming device 220, for example, at the manufacturing stage of the image forming device 220, may be additionally installed in the image forming device 220 from an external storage medium such as a USB memory, or may be additionally installed in the image forming device 220 from a network.

The control unit 226 includes, for example, a CPU, a ROM storing a program and various data, and a RAM as a memory applied as a workspace of the CPU of the control unit 226. The CPU of the control unit 226 executes the program stored in the storage unit 225 or the ROM of the control unit 226.

The control unit 226 executes the image forming program 225a and thereby realizes a print execution section 226a that executes printing in accordance with a print job transmitted from the print job transmission device, a preview image storage section 226b that stores a preview image of the print job, a print job ID management section 226c that manages a print job ID, and a preview image transmission section 226*d* that transmits the preview image.

Figure 10:
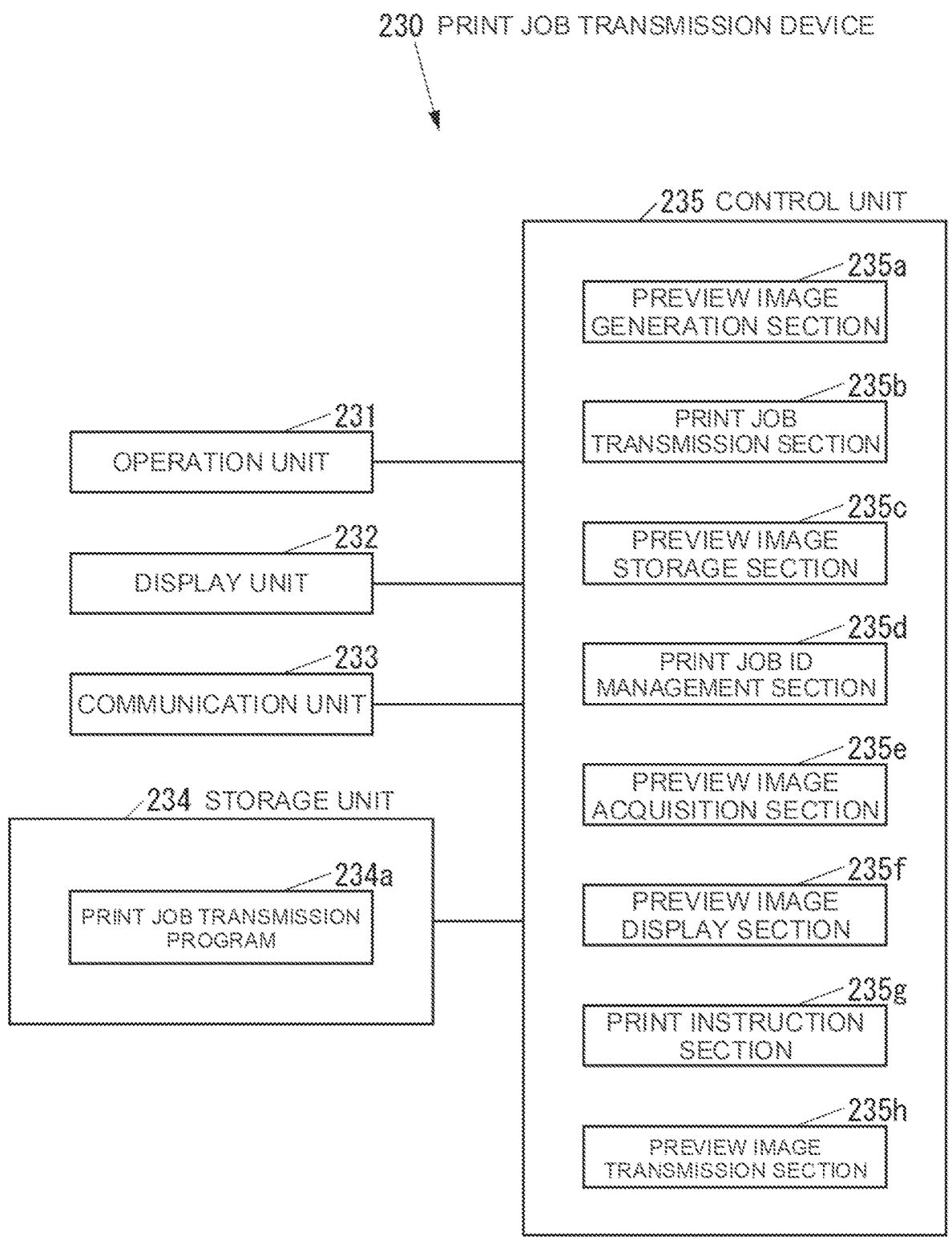
FIG. 10 is a block diagram of a print job transmission device illustrated in FIG. 8.

FIG. 10 is a block diagram of the print job transmission device 230.

As illustrated in FIG. 10, the print job transmission device 230 includes an operation unit 231 that is an operation device such as a keyboard and a mouse to which various operations are input, a display unit 232 that is a display device such as an LCD that displays various information, a communication unit 233 that is a communication device that communicates directly with an external device via a network such as a LAN or the Internet or by wire or wirelessly without a network, a storage unit 234 that is a non-volatile storage device such as a semiconductor memory or an HDD that stores various information, and a control unit 235 that controls the entire print job transmission device 230.

The storage unit 234 stores a print job transmission program 234*a* for transmitting a print job. The print job transmission program 234*a* may be installed in the print job transmission devices 230, for example, at the manufacturing stage of the print job transmission device 230, may be additionally installed in the print job transmission device 230 from an external storage medium such as a CD, a DVD, or a USB memory, or may be additionally installed in the print job transmission device 230 from a network.

The control unit 235 includes, for example, a CPU, a ROM storing a program and various data, and a RAM as a memory applied as a workspace of the CPU of the control unit 235. The CPU of the control unit 235 executes the program stored in the storage unit 234 or the ROM of the control unit 235.

The control unit 235 executes the print job transmission program 234*a* and thereby realizes a preview image generation section 235*a* that generates a preview image of a print job, a print job transmission section 235*b* that transmits a print job to the image forming device 220, a preview image storage section 235*c* that stores the preview image of the print job, a print job ID management section 235*d* that manages a print job ID, a preview image acquisition section 235*e* that acquires the preview image, a preview image display section 235*f* that displays the preview image, a print instruction section 235*g* that instructs the image forming device 220 to execute printing in accordance with the print job, and a preview image transmission section 235*h* that transmits the preview image.

Next, the operation of the image forming system 210 will be described.

First, the operation of the image forming system 210 when the print job transmission device 230 transmits a print job to the image forming device 220 will be described.

Figure 11:
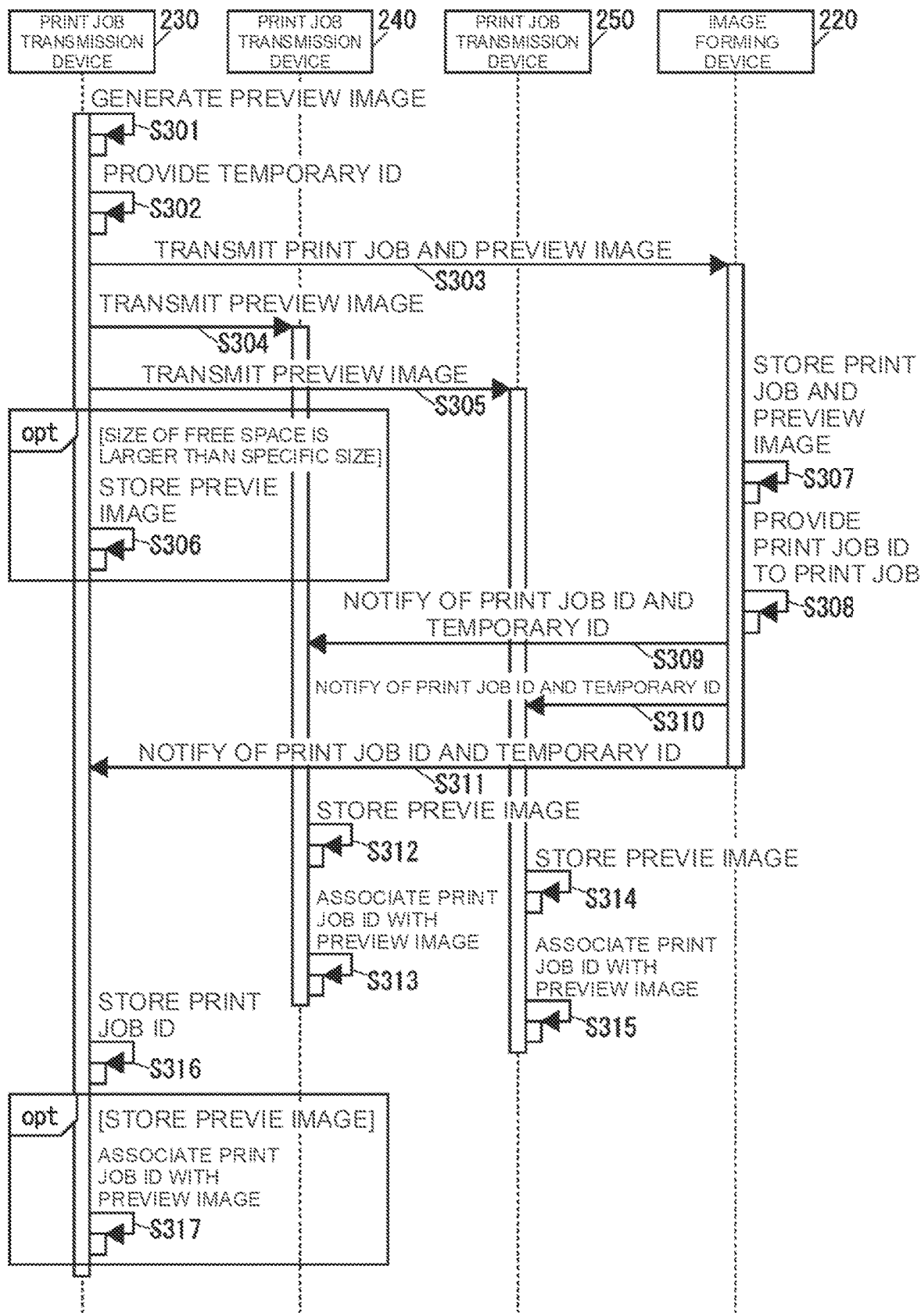
FIG. 11 is a sequence diagram of operations of the image forming system illustrated in FIG. 8 when the print job transmission device transmits a print job to the image forming device.

FIG. 11 is a sequence diagram of operations of the image forming system 210 when the print job transmission device 230 transmits a print job to the image forming device 220.

A user of the print job transmission device 230 can instruct the print job transmission device 230 from the operation unit 231 via the print job transmission program 234*a* to send a print job to the image forming device 220.

When transmission of a print job to the image forming device 220 is instructed, the preview image generation section 235*a* of the print job transmission device 230 interprets the print job as illustrated in FIG. 11 and thereby generates a preview image of the print job (S301).

After the processing of S301, the print job ID management section 235*d* of the print job transmission device 230 provides a temporary print job ID (hereinafter, referred to as "temporary ID") to the print job for which the preview image is generated in S301 and the preview image generated in S301 (S302).

After the processing of S302, the print job transmission section 235*b* of the print job transmission device 230 transmits the print job for which the preview image is generated in S301 and the preview image generated in S301 together with the temporary ID provided in S303 to the image forming device 220 (S303).

After the processing of S303, the print job transmission section 235*b* transmits the preview image generated in S301 together with the temporary ID provided in S303 to the print job transmission device 240 (S304).

After the processing of S304, the print job transmission section 235*b* transmits the preview image generated in S301 together with the temporary ID provided in S303 to the print job transmission device 250 (S305).

After the processing of S305, the preview image storage section 235*c* of the print job transmission device 230 stores the preview image generated in S301 together with the temporary ID provided in S303 in the storage unit 234 in a case where the size of a free space in a space for storing the preview image in the storage unit 234 is equal to or larger than a specific size (S306). Here, the specific size may be, for example, the size of the preview image generated in S301.

In addition, the control unit 235 may execute the processing of S303 to S306 in any order.

When the print job and the preview image are transmitted from the print job transmission device 230 in S303, the preview image storage section 226*b* of the image forming device 220 associates the print job and the preview image that are transmitted from the print job transmission device 230 in S303 with each other and stores the print job and the preview image in the storage unit 225 (S307). In addition, when the Hold setting that is a setting for allowing the image forming device 220 to wait for the execution of printing in accordance with a print job is provided to the print job transmitted from the print job transmission device 230 in S303, the print execution section 226*a* of the image forming device 220 waits for the execution of printing in accordance with the print job. Then, for example, when the execution of printing in accordance with the print job waiting to be executed is instructed via the print job transmission program from the user of the print job transmission device 230, the print job transmission device 240, or the print job transmission device 250, the print execution section 226*a* executes printing in accordance with the print job. On the other hand, the Hold setting is not provided to the print job transmitted from the print job transmission device 230 in S303. In such a case, when there is no previous print job to be executed before the print job, the print execution section 226*a* immediately executes printing in accordance with the print job.

After the processing of S307, the print job ID management section 226*c* of the image forming device 220 provides a print job ID to the print job stored in S307 (S308).

After the processing of S308, the print job ID management section 226*c* notifies the print job transmission device 240 of the print job ID provided in S308 together with the temporary ID transmitted from the print job transmission device 230 in S303 (S309).

After the processing of S309, the print job ID management section 226*c* notifies the print job transmission device 250 of the print job ID provided in S308 together with the temporary ID transmitted from the print job transmission device 230 in S303 (S310).

After the processing of S310, the print job ID management section 226c notifies the print job transmission device 230 of the print job ID provided in S308 together with the temporary ID transmitted from the print job transmission device 230 in S303 (S311).

In addition, the control unit 226 may execute the processing of S309 to S311 in any order.

When the preview image and the temporary ID are transmitted from the print job transmission device 230 in S304, a preview image storage section of the print job transmission device 240 associates the preview image and the temporary ID that are transmitted from the print job transmission device 230 in S304 with each other and stores the preview image and the temporary ID in the storage unit 225 (S312).

When the print job ID and the temporary ID are notified in S309, a print job ID management section of the print job transmission device 240 associates the print job ID notified in S309 with the preview image stored in the storage unit 225 in association with the temporary ID notified in S309, and stores the print job ID in a storage unit of the print job transmission device 240 (S313).

When the preview image and the temporary ID are transmitted from the print job transmission device 230 in S305, a preview image storage section of the print job transmission device 250 associates the preview image and the temporary ID that are transmitted from the print job transmission device 230 in S305 with each other and stores the preview image and the temporary ID in the storage unit 225 (S314).

When the print job ID and the temporary ID are notified in S310, a print job ID management section of the print job transmission device 250 associates the print job ID notified in S310 with the preview image stored in the storage unit 225 in association with the temporary ID notified in S310, and stores the print job ID in a storage unit of the print job transmission device 250 (S315).

When the print job ID and the temporary ID are notified in S311, the print job ID management section 235d of the print job transmission device 230 stores the print job ID notified in S311 in the storage unit 234 (S316).

In a case where the preview image is stored in the preview image storage section 235c of the print job transmission device 230 in S306, after the processing of S316, the preview image storage section 235c of the print job transmission device 230 associates the print job ID notified in S311 with the preview image stored in the storage unit 234 in association with the temporary ID notified in S311 (S317). In addition, the control unit 235 of the print job transmission device 230 may perform the processing of S317 before the processing of S316.

The operation of the image forming system 210 when the print job transmission device 230 transmits a print job to the image forming device 220 is described as above. However, the same applies to the operation of the image forming system 210 when the print job transmission device 240 transmits a print job to the image forming device 220 and to the operation of the image forming system 210 when the print job transmission device 250 transmits a print job to the image forming device 220.

Next, the operation of the image forming system 210 when the print job transmission device 230 displays a preview image of a print job will be described.

Figure 12:
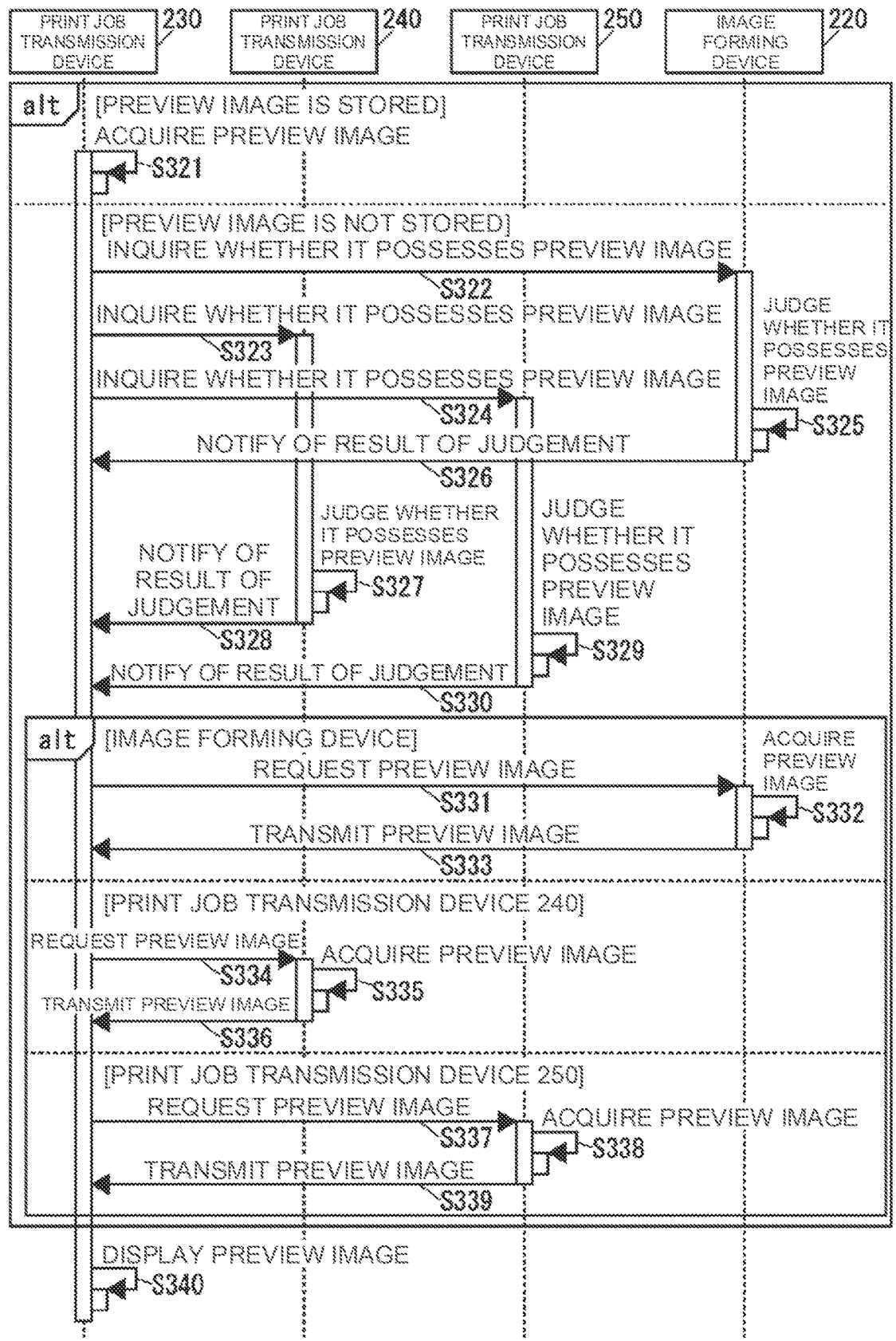
FIG. 12 is a sequence diagram of operations of the image forming system illustrated in FIG. 8 when the print job transmission device displays a preview image of a print job.

FIG. 12 is a sequence diagram of operations of the image forming system 210 when the print job transmission device 230 displays a preview image of a print job.

By specifying a print job ID of the print job, the user of the print job transmission device 230 can instruct the print job transmission device 230 from the operation unit 231 via the print job transmission program 234a to display the preview image of the print job (hereinafter, referred to as "target print job" in the description of the operation illustrated in FIG. 12). In addition, the print job ID management section 235d of the print job transmission device 230 displays a list of the print job IDs managed by the print job transmission device 230 itself on the display unit 232 or otherwise and allows the user of the print job transmission device 230 to specify the print job ID.

The instruction of displaying the preview image of the target print job is made, and then, in a case where the preview image associated with the print job ID of the print job is stored in the storage unit 234 as illustrated in FIG. 12, the preview image acquisition section 235e of the print job transmission device 230 acquires the preview image from the storage unit 234 (S321).

When the preview image associated with the print job ID of the target print job is not stored in the storage unit 234, the preview image acquisition section 235e inquires to the image forming device 220 whether the image forming device 220 possesses the preview image of the print job (S322). Here, the preview image acquisition section 235e includes the print job ID associated with the preview image that is a target of the inquiry in S322 into the inquiry.

After the processing of S322, the preview image acquisition section 235e inquires to the print job transmission device 240 whether the print job transmission device 240 possesses the preview image of the target print job (S323). Here, the preview image acquisition section 235e includes the print job ID associated with the preview image that is a target of the inquiry in S323 into the inquiry.

After the processing of S323, the preview image acquisition section 235e inquires to the print job transmission device 250 whether the print job transmission device 250 possesses the preview image of the target print job (S324). Here, the preview image acquisition section 235e includes the print job ID associated with the preview image that is a target of the inquiry in S324 into the inquiry.

In addition, the control unit 235 of the print job transmission device 230 may perform the processing of S322 to S324 in any order.

The preview image transmission section 226d of the image forming device 220 receives the inquiry in S322 from the print job transmission device 230 and then judges whether the storage unit 225 possesses the preview image associated with the print job to which the print job ID included in the inquiry is provided (S325).

After the processing of S325, the preview image transmission section 226d notifies the print job transmission device 230 of a result of the judgement in S325 (S326).

The preview image transmission section of the print job transmission device 240 receives the inquiry in S323 from the print job transmission device 230 and then judges whether the storage unit of the print job transmission device 240 possesses the preview image associated with the print job to which the print job ID included in the inquiry is provided (S327).

After the processing of S327, the preview image transmission section of the print job transmission device 240 notifies the print job transmission device 230 of a result of the judgement in S327 (S328).

The preview image transmission section of the print job transmission device 250 receives the inquiry in S324 from the print job transmission device 230 and then judges whether the storage unit of the print job transmission device 250 possesses the preview image associated with the print job to which the print job ID included in the inquiry is provided (S329).

After the processing of S329, the preview image transmission section of the print job transmission device 250 notifies the print job transmission device 230 of a result of the judgement in S329 (S330).

The preview image acquisition section 235*e* of the print job transmission device 230 requests, as described below, the preview image from the device of the image forming device 220, the print job transmission device 240, and the print job transmission device 250, which firstly notifies that it possesses the preview image of the target print job.

When of the image forming device 220, the print job transmission device 240, and the print job transmission device 250, the image forming device 220 is the device that firstly notifies that it possesses the preview image of the target print job, the preview image acquisition section 235*e* requests the preview image of the target print job from the image forming device 220 (S331). Here, the preview image acquisition section 235*e* includes the print job ID associated with the preview image that is a target of the request in S331 into the request.

The preview image transmission section 226*d* of the image forming device 220 receives the request in S331 from the print job transmission device 230 and then acquires the preview image associated with the print job to which the print job ID included in the request is provided from the storage unit 225 (S332).

After the processing of S332, the preview image transmission section 226*d* transmits the preview image acquired in S332 to the print job transmission device 230 (S333).

When of the image forming device 220, the print job transmission device 240, and the print job transmission device 250, the print job transmission device 240 is the device that firstly notifies that it possesses the preview image of the target print job, the preview image acquisition section 235*e* of the print job transmission device 230 requests the preview image of the target print job from the print job transmission device 240 (S334). Here, the preview image acquisition section 235*e* includes the print job ID associated with the preview image that is a target of the request in S334 into the request.

The preview image transmission section of the print job transmission device 240 receives the request in S334 from the print job transmission device 230 and then acquires the preview image associated with the print job to which the print job ID included in the request is provided from the storage unit of the print job transmission device 240 (S335).

After the processing of S335, the preview image transmission section of the print job transmission device 240 transmits the preview image acquired in S335 to the print job transmission device 230 (S336).

When of the image forming device 220, the print job transmission device 240, and the print job transmission device 250, the print job transmission device 250 is the device that firstly notifies that it possesses the preview image of the target print job, the preview image acquisition section 235*e* of the print job transmission device 230 requests the preview image of the target print job from the print job transmission device 250 (S337). Here, the preview image acquisition section 235*e* includes the print job ID associated with the preview image that is a target of the request in S337 into the request.

The preview image transmission section of the print job transmission device 250 receives the request in S337 from the print job transmission device 230 and then acquires the preview image associated with the print job to which the print job ID included in the request is provided from the storage unit of the print job transmission device 250 (S338).

After the processing of S338, the preview image transmission section of the print job transmission device 250 transmits the preview image acquired in S338 to the print job transmission device 230 (S339).

When the processing of S321 is finished, the preview image is transmitted from the image forming device 220 in S333, the preview image is transmitted from the print job transmission device 240 in S336, or the preview image is transmitted from the print job transmission device 250 in S339, the preview image display section 235*f* of the print job transmission device 230 displays, on the display unit 232, the preview image acquired in S321, the preview image transmitted from the image forming device 220 in S333, the preview image transmitted from the print job transmission device 240 in S336, or the preview image transmitted from the print job transmission device 250 in S339 (S340).

The operation of the image forming system 210 when the print job transmission device 230 displays a preview image of a print job is described as above. However, the same applies to the operation of the image forming system 210 when the print job transmission device 240 displays a preview image of a print job and to the operation of the image forming system 210 when the print job transmission device 250 displays a preview image of a print job.

Next, the operation of the image forming system 210 when the print job transmission device 230 instructs the image forming device 220 to execute printing in accordance with a print job will be described.

Figure 13:
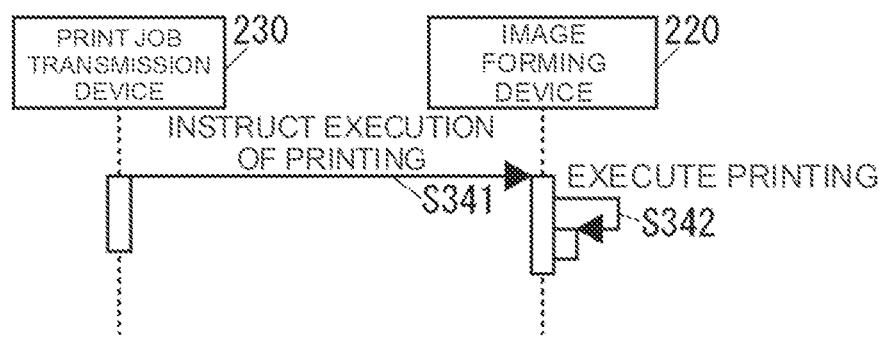
FIG. 13 is a sequence diagram of operations of the image forming system illustrated in FIG. 8 when the print job transmission device instructs the image forming device to execute printing in accordance with a print job.

FIG. 13 is a sequence diagram of operations of the image forming system 210 when the print job transmission device 230 instructs the image forming device 220 to execute printing in accordance with a print job.

After confirming the preview image displayed on the display unit such as the display unit 232 of any of the print job transmission devices in the image forming system 210, the user of the print job transmission device 230 can instruct the print job transmission device 230 from the operation unit 231 via the print job transmission program 234*a* to send an instruction to the image forming device 220 of executing printing in accordance with the print job that corresponds to the preview image. For example, the image forming device 220 waits for execution of printing in accordance with the print job that corresponds to the preview image displayed on the display unit 232. In such a case, after confirming the preview image, the user of the print job transmission device 230 can instruct the print job transmission device 230 via the print job transmission program 234*a* to send the instruction to the image forming device 220 of executing printing in accordance with the print job. Also, execution of printing in accordance with the print job that corresponds to the preview image displayed on the display unit 232 is finished in the image forming device 220. Even in such a case, after confirming the preview image, the user of the print job transmission device 230 can instruct the print job transmission device 230 via the print job transmission program 234*a* to send an instruction to the image forming device 220 of re-executing printing in accordance with the print job.

When the instruction to the image forming device 220 of executing printing in accordance with the print job is sent, the print instruction section 235*g* of the print job transmission device 230, as illustrated in FIG. 13, instructs the image forming device 220 to execute printing in accordance with the print job (S341). Here, the print instruction section 235*g* includes the print job ID associated with the preview image that is a target of the instruction in S341 into the request.

The print execution section 226a of the image forming device 220 receives the instruction in S341 from the print job transmission device 230 and then executes, with the printer 223, printing in accordance with the print job to which the print job ID included in the instruction is provided (S342).

The operation of the image forming system 210 when the print job transmission device 230 instructs the image forming device 220 to execute printing in accordance with a print job is described as above. However, the same applies to the operation of the image forming system 210 when the print job transmission device 240 instructs the image forming device 220 to execute printing in accordance with a print job and to the operation of the image forming system 210 when the print job transmission device 250 instructs the image forming device 220 to execute printing in accordance with a print job.

As described above, in the image forming system 210, when transmitting a print job to the image forming device 220, the print job transmission device transmits also a preview image of the print job generate by the print job transmission device itself to the image forming device 220 (S303), and the image forming device 220 stores the preview image transmitted from the print job transmission device (S307). The print job transmission device requests the preview image from the image forming device 220 (S331) and acquires the preview image from the image forming device 220 (S333), and the print job transmission device displays the preview image acquired from the image forming device 220 (S340). Therefore, a print job transmission device other than the print job transmission device that has generated the preview image can display the preview image. In other words, when transmitting a print job to the image forming device 220, the print job transmission device transmits also a preview image of the print job generated by the print job transmission device itself to the image forming device 220 (S303), requests the preview image from the image forming device 220 (S331), acquires the preview image from the image forming device 220 (S333), and displays the acquired preview image (S340). Therefore, the print job transmission device can display not only the preview image generated by the print job transmission device itself but also a preview image generated by a print job transmission device other than the print job transmission device itself. In addition, the image forming device 220 stores the preview image transmitted from the print job transmission device (S307), and when the stored preview image is requested by the print job transmission device, the image forming device 220 transmits the preview image to the print job transmission device (S333). Therefore, the preview image can be displayed on a print job transmission device other than the print job transmission device that has generated the preview image.

In the image forming system 210, when transmitting a print job to the image forming device 220, the print job transmission device transmits a preview image of the print job generated by the print job transmission device itself to another print job transmission device (S304 or S305), and the print job transmission device requests the preview image from the another print job transmission device (S334 or S337), acquires the preview image from the another print job transmission device (S336 or S339), and displays the preview image acquired from the another print job transmission device (S340). Therefore, a print job transmission device other than the print job transmission device that has generated the preview image can display the preview image. In other words, when transmitting a print job to the image forming device 220, the print job transmission device transmits a preview image of the print job generated by the print job transmission device itself to another print job transmission device (S304 or S305), requests the preview image from the another print job transmission device (S334 or S337), acquires the preview image from the another print job transmission device (S336 or S339), and displays the acquired preview image (S340). Therefore, the print job transmission device can display not only the preview image generated by the print job transmission device itself but also a preview image generated by a print job transmission device other than the print job transmission device itself.

The image forming system 210 is configured such that the print job transmission device can acquire a preview image from another print job transmission device. Therefore, even when the print job transmission device cannot temporarily communicate with the image forming device 220 or when the preview image stored in the image forming device 220 is damaged, the print job transmission device acquires the preview image from the another print job transmission device and thus can display the preview image.

The image forming system 210 is configured such that the print job transmission device can acquire a preview image from another print job transmission device. Therefore, the processing in which the print job transmission device transmits the preview image to the another print job transmission device may be put ahead of the processing in which the image forming device 220 transmits the preview image to the print job transmission device. Also, the processing in which the image forming device 220 transmits the preview image to the print job transmission device may not be performed. With this configuration, the image forming system 210 can reduce a load applied to the image forming device 220, and as a result, for example, reduction of the printing speed in the image forming device 220 can be prevented.

For example, in the operation illustrated in FIG. 12, the print job transmission device 230 requests the preview image from the device of the image forming device 220, the print job transmission device 240, and the print job transmission device 250, which firstly notifies that it possesses the preview image of the target print job (S331, S334, or S337). However, as illustrated in FIG. 14, the print job transmission device 230 may put the processing in which the print job transmission device 240 or the print job transmission device 250 transmits the preview image to the print job transmission device 230 ahead of the processing in which the image forming device 220 transmits the preview image to the print job transmission device 230.

Figure 14:
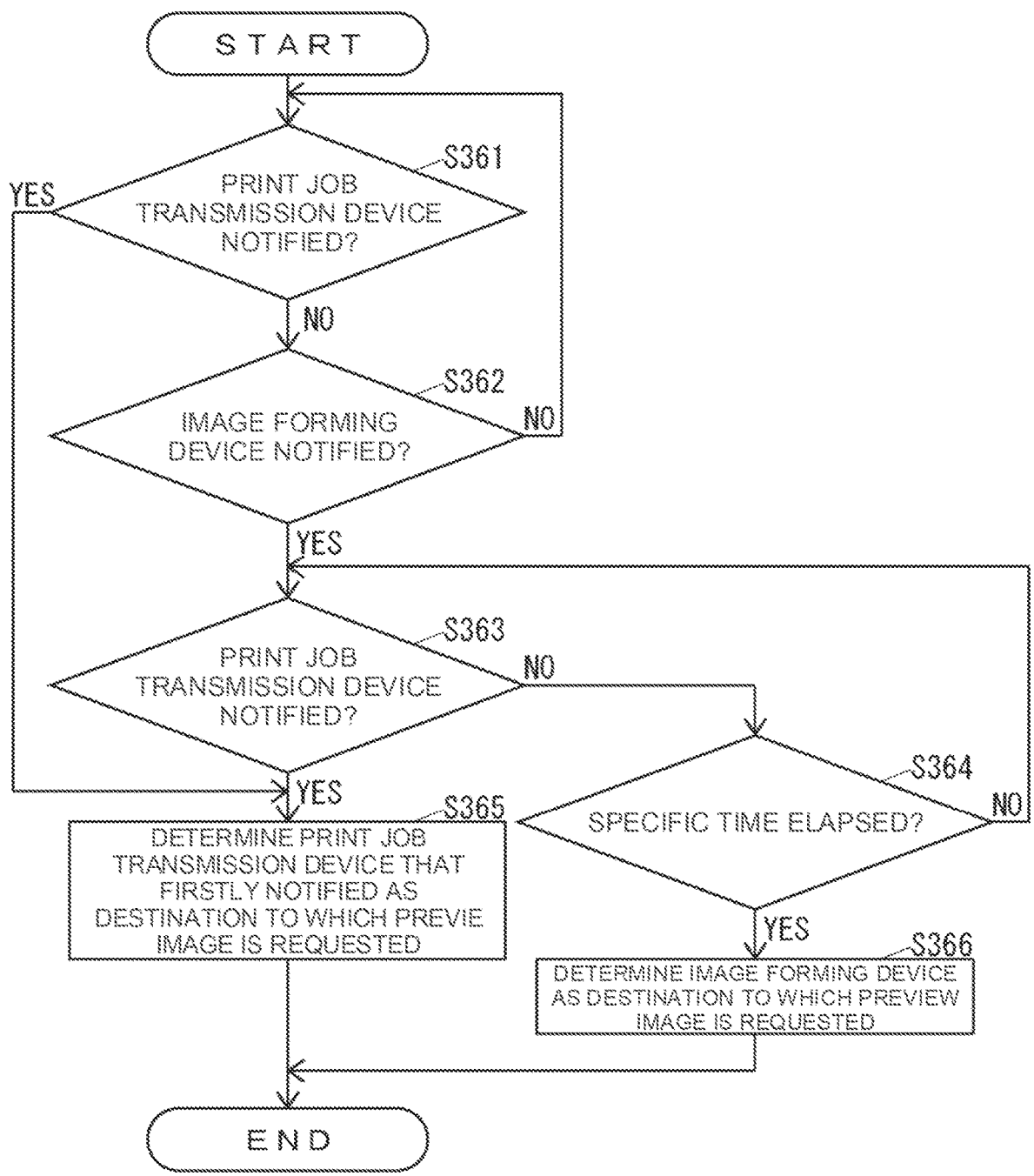
FIG. 14 is a flowchart of one example of operations of the print job transmission device illustrated in FIG. 10 when determining a destination to which the preview image is requested.

FIG. 14 is a flowchart of one example of the operation of the print job transmission device 230 when determining a destination to which the preview image is requested.

After executing any of the processing of S322 to S324, the preview image acquisition section 235e of the print job transmission device 230 executes the operation illustrated in FIG. 14.

As illustrated in FIG. 14, the preview image acquisition section 235e judges whether the print job transmission device 240 or the print job transmission device 250 has notified that it possesses the preview image of the print job (S361).

The preview image acquisition section 235e judges in S361 that the print job transmission device 240 or the print job transmission device 250 has not notified that it possesses the preview image of the print job, and then judges whether the image forming device 220 has notified that it possesses the preview image of the print job (S362).

The preview image acquisition section 235*e* judges in S362 that the image forming device 220 has not notified that it possesses the preview image of the print job and then executes the processing of S361.

The preview image acquisition section 235*e* judges in S362 that the image forming device 220 has notified that it possesses the preview image of the print job, and then judges whether the print job transmission device 240 or the print job transmission device 250 has notified that it possesses the preview image of the print job (S363).

The preview image acquisition section 235*e* judges in S363 that the print job transmission device 240 or the print job transmission device 250 has not notified that it possesses the preview image of the print job, and then judges whether a specific time has elapsed after judgement in S362 that the image forming device 220 has notified that it possesses the preview image of the print job (S364).

The preview image acquisition section 235*e* judges in S364 that the specific time has not elapsed after judgement in S362 that the image forming device 220 has notified that it possesses the preview image of the print job, and then executes the processing of S363.

The preview image acquisition section 235*e* judges in S361 or S363 that the print job transmission device 240 or the print job transmission device 250 has notified that it possesses the preview image of the print job, and then determines the device of the print job transmission device 240 and the print job transmission device 250, which has firstly notified that it possesses the preview image of the target print job, as a destination to which the preview image is requested (S365), and the operation illustrated in FIG. 14 is finished.

The preview image acquisition section 235*e* judges in S364 that the specific time has elapsed after judgement in S362 that the image forming device 220 has notified that it possesses the preview image of the print job, and then determines the image forming device 220 as a destination to which the preview image is requested (S366), and the operation illustrated in FIG. 14 is finished.

In the present embodiment, the image forming system 210 includes three print job transmission devices that are the print job transmission device 230, the print job transmission device 240, and the print job transmission device 250. However, the image forming system 210 may be configured in the same manner when including only two print job transmission devices or when including four or more print job transmission devices.

What is claimed is:

1. A print job transmission device, comprising:
  a preview image generation section that generates a preview image of a print job;
  a print job transmission section that transmits a print job to an image forming device that executes printing in accordance with the print job;
  a preview image acquisition section that acquires the preview image; and
  a preview image display section that displays the preview image,
  wherein when transmitting a print job to the image forming device, the preview image generation section generates the preview image of the print job to be transmitted and the print job transmission section transmits the print job to be transmitted and the preview image of the print job, generated by the preview image generation section, to the image forming device,
  the preview image acquisition section requests the preview image from the image forming device and acquires the preview image from the image forming device, and
  the preview image display section displays the preview image acquired by the preview image acquisition section from the image forming device.

2. The print job transmission device according to claim 1, further comprising a preview image storage section that stores the preview image of the print job,
  wherein when transmitting the print job to the image forming device, the preview image storage section stores the preview image generated by the preview image generation section and transmitted to the image forming device by the print job transmission section.

3. The print job transmission device according to claim 1, wherein when transmitting the print job to the image forming device, the print job transmission section transmits the print job to be transmitted and the preview image of the print job, generated by the preview image generation section, to the image forming device and each of other print job transmission devices connected to the image forming device.

4. The print job transmission device according to claim 3, wherein the preview image acquisition section requests the preview image from the image forming device and the each of the other print job transmission devices, and acquires the preview image from any one of the image forming device and the other print job transmission devices.

5. An image forming device, comprising:
  a print execution section that executes printing in accordance with a print job transmitted from a print job transmission device;
  a preview image storage section that stores a preview image of the print job; and
  a preview image transmission section that transmits the preview image,
  wherein the preview image storage section stores the preview image which is generated by and transmitted from the print job transmission device, and
  when the preview image stored by the preview image storage section is requested by the print job transmission device, the preview image transmission section transmits the preview image to the print job transmission device.

6. An image forming system, comprising:
  an image forming device that executes printing in accordance with a print job; and
  a plurality of print job transmission devices each of which transmits a print job to the image forming device,
  wherein the print job transmission device comprises: a preview image generation section that generates a preview image of a print job;
  a print job transmission section that transmits a print job to the image forming device;
  a preview image acquisition section that acquires a preview image; and
  a preview image display section that displays the preview image,
  the image forming device comprises: a print execution section that executes printing in accordance with a print job transmitted from the print job transmission device;
  a preview image storage section that stores a preview image; and
  a preview image transmission section that transmits the preview image, when transmitting a print job to the image forming device, the preview image generation section generates the preview image of the print job to be transmitted and the print job transmission section transmits the print job to be transmitted and the preview image of the print job, generated by the preview image generation section, to the image forming device, the preview image storage section stores the preview image which is generated by and transmitted from the print job transmission device, the preview image acquisition section requests the preview image from the image forming device and acquires the preview image from the image forming device, when the preview image stored by the preview image storage section is requested by the print job transmission device, the preview image transmission section transmits the preview image to the print job transmission device, and the preview image display section displays the preview image acquired by the preview image acquisition section from the image forming device.

7. The image forming system according to claim 6, wherein the print job transmission device further comprising a storage unit,
wherein when transmitting the print job to the image forming device, the print job transmission device stores, in the storage unit, the preview image generated by the preview image generation section and transmitted to the image forming device by the print job transmission section.

8. The image forming system according to claim 6, wherein when transmitting the print job to the image forming device, the print job transmission section transmits the print job to be transmitted and the preview image of the print job, generated by the preview image generation section, to the image forming device and each of other print job transmission devices of the plurality of print job transmission devices.

9. The image forming system according to claim 8, wherein the preview image acquisition section requests the preview image from the image forming device and the each of the other print job transmission devices, and acquires the preview image from any one of the image forming device and the other print job transmission devices.

* * * * *